US009503849B1

(12) United States Patent
Gavade et al.

(10) Patent No.: US 9,503,849 B1
(45) Date of Patent: Nov. 22, 2016

(54) LOCATION BASED MEDIA CONTENT ACCESS MANAGEMENT SYSTEMS AND METHODS

(71) Applicant: Verizon Patent and Licensing Inc., Arlington, VA (US)

(72) Inventors: Sameer Gavade, Irving, TX (US); Venkata S. Adimatyam, Irving, TX (US); Sanjay Ahuja, Irving, TX (US); Binayak Biswal, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/980,228

(22) Filed: Dec. 28, 2015

(51) Int. Cl.
*H04W 24/00* (2009.01)
*H04W 4/02* (2009.01)
*H04W 48/04* (2009.01)

(52) U.S. Cl.
CPC .............. *H04W 4/021* (2013.01); *H04W 48/04* (2013.01)

(58) Field of Classification Search
CPC ....... H04W 2/02; H04W 48/04; G06F 21/10; G06F 2221/2111; H04N 21/235; H04N 21/23614; H04N 21/2541; H04N 21/4348; H04N 21/435; H04N 21/43615; H04N 21/4627; H04N 21/835; H04N 21/8355
USPC ......................................... 455/456.2; 715/705
See application file for complete search history.

(56) References Cited

U.S. PATENT DOCUMENTS

| 2008/0097919 | A1* | 4/2008 | Szucs | G06F 21/10 705/52 |
| 2010/0211431 | A1* | 8/2010 | Lutnick | G06Q 30/02 705/14.12 |
| 2011/0069940 | A1* | 3/2011 | Shimy | G11B 27/105 386/296 |
| 2011/0320628 | A1* | 12/2011 | Gutarin | H04L 65/601 709/231 |
| 2014/0040374 | A1* | 2/2014 | Olsen | H04L 67/306 709/204 |
| 2014/0195675 | A1* | 7/2014 | Silver | H04L 65/1083 709/224 |

* cited by examiner

*Primary Examiner* — Mahendra Patel

(57) ABSTRACT

An exemplary method includes a media content access system maintaining a media content restriction list that specifies a plurality of media content access parameters that govern access to media content processed by a media player, receiving, from a mobile computing device, a request for the media player to stream the media content to the mobile computing device, determining, based on a geolocation key included in the request and a geographic restriction parameter, whether the mobile computing device is within the geographic area specified by the geographic restriction parameter, and performing a media content access operation. The media content access operation may include one of directing the media player to stream the media content to the mobile computing device and preventing the media player from streaming the media content to the mobile computing device. Corresponding methods and systems are also described.

20 Claims, 10 Drawing Sheets

LOCATION BASED MEDIA CONTENT ACCESS MANAGEMENT SYSTEMS AND METHODS

BACKGROUND INFORMATION

The advent of set-top box devices has provided users of media services with access to a large number and variety of media content choices. For example, a user of a media service may choose to access and experience a variety of media content and specific services such as broadcast television programs, pay-per-view services, video-on-demand programming, Internet services, and audio programming by way of a set-top box device.

A provider of such a media service ("service provider") typically obtains media content from one or more content providers and makes the media content accessible to users of the media service, such as by distributing the media content to set-top box devices operated by the users of the media service. Certain content providers have a vested interest in controlling (e.g., restricting) how and where the media content is distributed so as to prevent piracy, protect the value of the media content, and maximize revenue. The service provider, on the other hand, has a vested interest in maximizing competitive advantage and user satisfaction with the media service, such as by providing robust features for use by users of the media service to conveniently access media content.

For example, a service provider may want to provide a remote access service in which the set-top box device streams media content to a mobile computing device (e.g., smartphones, tablet computers, etc.) while a user of the mobile computing device travels. However, certain content providers may be hesitant to allow the service provider to provide such a remote access service because even though the set-top box device may be located in a geographic area where access to the media content is authorized, the mobile computing device that would receive the streamed media content may be located in a different geographic area where access to the media content is not authorized.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
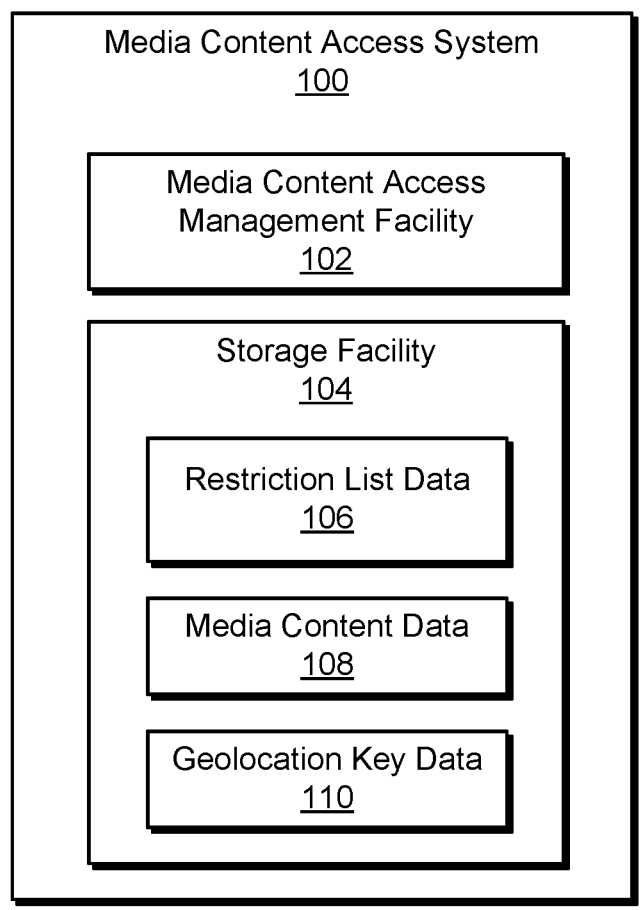
FIG. 1 illustrates an exemplary media content access system according to principles described herein.

Exemplary location-based media content access management systems and methods are described herein. In certain examples, a media content access system may maintain a media content restriction list that specifies a plurality of media content access parameters that govern access to media content processed by a media player. The plurality of media content access parameters may include a geographic restriction parameter that specifies a geographic area within which remote access to the media content processed by the media player is permitted. The media content access system may receive, from a mobile computing device, a request for the media player to stream the media content to the mobile computing device. The request may include a geolocation key that is representative of a geographic location of the mobile computing device when the mobile computing device provides the request. Based on the geolocation key included in the request and the geographic restriction parameter, the media content access system may determine whether the mobile computing device is within the geographic area specified by the geographic restriction parameter. In response to the determining of whether the mobile computing device is within the geographic area specified by the geographic restriction parameter, the media content access system may perform a media content access operation. For example, if the media content access system determines that the mobile computing device is within the geographic area specified by the geographic restriction parameter, the media content access system may direct the media player to stream the media content to the mobile computing device. On the other hand, if the media content access system determines that the mobile computing device is not within the geographic area specified by the geographic restriction parameter, the media content access system may prevent the media player from streaming the media content to the mobile computing device.

As used herein, a "mobile computing device" may include any suitable device that may be configured to remotely receive streaming content from a media player by way of a network. For example, a mobile computing device may include, but is not limited to, a mobile phone, a smartphone, a tablet computer, a laptop computer, and/or any other mobile computing device as may serve a particular implementation.

As used herein, the term "media player" may refer to any device that is dedicated to function primarily as a device to access media content and/or media services provided by a specific media content service provider and/or provided to an end user of a media content distribution service by the media content service provider. For example, a media player may include a set-top box device such as a converter box, a television receiver, a tuner device, an Internet Protocol (IP) set top box, an IP television ("IPTV") set top box, and/or any other type of device capable of performing processes described herein. In certain examples, a media player may include a device having digital video recording ("DVR") capabilities.

As used herein, the term "media content" may refer to any television program, on-demand media program, pay-per-view media program, broadcast media program (e.g., live broadcast television program), multicast media program (e.g., multicast television program), narrowcast media program (e.g., narrowcast video-on-demand program), IPTV media program, advertisement, video, movie, audio program, radio program, video clip, audio clip, user-generated audio program, user-generated video program, or any other media program or audio-video program that may be played back by a media player and/or a mobile computing device for presentation to a user (e.g., a media program that a user may access and consume by way of a media program service).

Various benefits may be realized in accordance with the systems and methods described herein. For example, exemplary systems and methods described herein may facilitate efficient and/or convenient remote access by a mobile computing device to media content streamed by way of a media player. Exemplary systems and methods described herein may also efficiently implement geographic restrictions to either permit or restrict access to media content streamed from a media player to a mobile computing device based on a geographic location of the mobile computing device. These and/or additional or alternative benefits that may be provided by exemplary systems and methods described herein will be made apparent by the following description. Exemplary location-based media content access management systems and methods will now be described in reference to the accompanying drawings.

FIG. 1 illustrates an exemplary media content access system 100 ("system 100"). System 100 may perform one or more of the operations described herein to implement geographic restrictions associated with a mobile computing device accessing media content from a media player. As shown in FIG. 1, system 100 may include, without limitation, a media content access management facility 102 ("management facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, the facilities 102 and 104 may be combined into a single facility or split into additional facilities as may serve a particular implementation. Additionally or alternatively, one or more of the facilities 102 and 104 may be omitted from and external to system 100 in other implementations. For example, storage facility 104 may be external of system 100 in some alternative implementations. Facilities 102 and 104 of system 100 may include or be otherwise implemented by one or more physical computing devices. In such implementations, system 100 may be referred to as a computer-implemented system 100. Facilities 102 and 104 will now be described in more detail.

Storage facility 104 may be configured to store restriction list data 106 representative of information specifying where and how a mobile computing device may access media content streamed from a media player. For example, restriction list data 106 may include a geographic restriction parameter, a maximum streaming count parameter, and/or any other suitable parameter associated with a mobile computing device remotely streaming media content from a media player. Specific examples of parameters that may be included as part of restriction list data 106 are described herein.

Storage facility 104 may also store media content data 108 representative of a media program and/or content that makes up the media program. In addition, storage facility 104 may store geolocation key data 110 representative of geolocation keys that identify a geographic location of a mobile computing device. Examples of management facility 102 using geolocation key data 110 to either provide access to media content or prevent access to media content are described herein. Storage facility 104 may maintain additional or alternative data as may serve a particular implementation.

Management facility 102 may perform one or more operations associated with a mobile computing device remotely streaming media content from a media player. For example, management facility 102 may utilize one or more media content access parameters to determine whether a mobile computing device is permitted to access media content streamed by a media player (e.g., a media player located at a home of the user) while the mobile computing device is at a particular geographic location (e.g., a geographic location remote from the home of the user). To that end, management facility 102 may maintain a media content restriction list that specifies a plurality of media content access parameters that govern access to media content processed by a media player. Management facility 102 may maintain the restriction list in any suitable manner. For example, management facility 102 may receive the media content restriction list from a media content server. Management facility 102 may receive the media content restriction list at any suitable time. Management facility 102 may store the media content restriction list in any suitable manner (e.g., locally in a memory of a media player) to be used for any suitable purpose, such as described herein. In certain examples, management facility 102 may periodically receive an updated media content restriction list from the media content server to replace a previously stored media content restriction list. In certain examples, the media content restriction list may be continuously updated as different media content is provided by a media content distribution service. Additionally or alternatively, management facility 102 may access a media content restriction list that is maintained remotely from a media player (e.g., at the media content server).

The plurality of media content access parameters included in the media content restriction list may include any parameter that may be used to determine whether to allow or prevent access to media content based on a geographic location of a mobile computing device. For example, the plurality of media content access parameters may include a geographic restriction parameter that specifies a geographic area within which remote access to the media content processed by the media player is permitted. The geographic restriction parameter may specify the geographic area in any suitable manner. For example, the geographic restriction parameter may specify a bounding box (e.g., a rectangle associated with a geohash) within which access to the media content is permitted. The geographic area specified by the geographic restriction parameter may have any size as may suit a particular implantation. In certain examples, the geographic restriction parameter may pertain to a channel that carries the media content (i.e., may only apply to media content carried by the channel). Additionally or alternatively, the geographic restriction parameter may pertain to a media content provider that provides the media content (i.e., may only apply to media content provided by the media content provider). Additionally or alternatively, the geographic restriction parameter may pertain to a particular media program included in the media content (i.e., may only apply to the particular media program). Specific examples of geographic restriction parameters are provided herein.

Additionally or alternatively, the plurality of media content access parameters may include a parameter that specifies a maximum number of mobile computing devices that are permitted to stream the media content from the media player at a given time. In certain examples, such a parameter may be a global parameter that applies to all of the media content accessible by way of the media player. Additionally or alternatively, such a parameter may be specific to a channel that carries the media content, a media content provider that provides the media content, or a particular media program included in the media content. To illustrate, the plurality of media content access parameters may include a first parameter that specifies that a maximum number of five mobile computing devices may stream media content from a media player at a given time. The plurality of media content access parameters may also include a second parameter that specifies that two mobile computing devices may stream media content from a first channel at a given time, a third parameter that specifies that two mobile computing devices may stream media content from a second channel at a given time, and a fourth parameter that specifies that two mobile computing devices may stream media content from a third channel at a given time. In such an example, the first parameter is a global parameter that applies to all of the first, second, and third channels. The second, third, and fourth parameters, on the other hand, are specific to the first, second, and third channels, individually. As such, in this example, a maximum of five mobile computing devices may stream media content from a particular media player at a given time through some combination of the first, second, and third channels (e.g., two mobile computing devices from the first channel, two mobile computing devices from the second channel, and one mobile computing device from the third channel).

In certain examples, the media content restriction list may specify an additional plurality of media content access parameters that govern access to additional media content processed by the media player. The additional plurality of media content access parameters may include an additional geographic restriction parameter that specifies an additional geographic area within which remote access to the additional media content processed by the media player is permitted. To illustrate, the media content restriction list may include a first plurality of media content access parameters that govern access to a first media program included in the media content. The media content restriction list may also include a second plurality of media content access parameters that govern access to a second media program included in the media content. Management facility 102 may either allow or prevent streaming of the first media program and/or the second media program to the mobile computing device based on the respective parameters included in the first plurality of media content access parameters and the second plurality of media content access parameters.

Management facility 102 may receive, from a mobile computing device, a request for a media player to stream the media content to the mobile computing device. Management facility 102 may receive the request in any suitable manner and through any suitable communication technology, such as described herein. The request may include any suitable information associated with streaming the media content to the mobile computing device. For example, the request may identify the media content and may include a token indicating that the mobile computing device is authorized to stream media content from the media player. The request may also include a geolocation key that is representative of a geographic location of the mobile computing device when the mobile computing device provides the request to the media player.

As used herein, the term "geolocation key" may refer to any unique identifier of a specific geographic location of a mobile computing device. A geolocation key may have any suitable form as may suit a particular implementation. In certain examples, the geolocation key may include a unique alphanumeric string (e.g., a geohash) that may be generated based on latitude and longitude coordinates of the mobile computing device.

The geolocation key may be generated (e.g., by the mobile computing device or management facility 102) at any suitable time and in any suitable manner. For example, longitude and latitude coordinates of the mobile computing device may be detected by accessing/utilizing any suitable location features of the mobile computing device, including, without limitation, Global Positioning System ("GPS") technologies and terrestrial signaling triangulation technologies. Based on the detected longitude and latitude coordinates of the mobile computing device, the mobile computing device or management facility 102 may generate or facilitate generating a unique identifier to use as the geolocation key. For example, the mobile computing device or management facility 102 may provide the latitude and longitude coordinates in any suitable manner to a web portal such as geohash.org, which may be used to generate a geohash based on the latitude and longitude coordinates. In certain examples, the mobile computing device or management facility 102 may continuously or periodically monitor the geographic location of the mobile computing device as the mobile computing device moves within a geographic zone and generate a series of geolocation keys. Exemplary geolocation keys are described herein.

Based on the geolocation key included in the request and the geographic restriction parameter, management facility 102 may determine whether the mobile computing device is within the geographic area specified by the geographic restriction parameter. Management facility 102 may make such a determination in any suitable manner. For example, management facility 102 may derive or otherwise identify the geographic coordinates of the mobile computing device based on the geolocation key. Management facility 102 may compare the determined coordinates associated with the geolocation key with the geographic area specified by the geographic restriction parameter to determine whether the mobile computing device is within the geographic area specified by the geographic restriction parameter. In examples where the geolocation key comprises a geohash key and the geographic restriction parameter comprises a geohash, management facility 102 may compare the geohash key with the geohash specified by the geographic restriction parameter. If the geohash key is within a bounding box defined by the geohash specified by the geographic restriction parameter, management facility 102 may determine that the mobile computing device is within the geographic area specified by the geographic restriction parameter.

In response to determining whether the mobile computing device is within the geographic area specified by the geographic restriction parameter, management facility 102 may perform a media content access operation to either prevent or allow streaming of the media content to the mobile computing device. For example, when management facility 102 determines that the mobile computing device is within the geographic area specified by the geographic restriction parameter, the media content access operation may include management facility 102 directing the media player to stream the media content to the mobile computing device. On the other hand, when management facility 102 determines that the mobile computing device is not within the geographic area specified by the geographic restriction parameter, the media content access operation may include management facility 102 preventing the media player from streaming the media content to the mobile computing device. Management facility 102 may prevent the media player from streaming the media content to the mobile computing device in any suitable manner. For example, management facility 102 may instruct the media player to abstain from streaming the media content to the mobile computing device.

In certain examples, after management facility 102 determines that the mobile computing device is within the geographic area specified by the geographic restriction parameter, management facility 102 may provide a uniform resource locator ("URL") to the mobile computing device to facilitate playback of the media content. The mobile computing device may then use the URL to initiate playback of the media content from the media player. Examples of how a URL may be provided to a mobile computing device are described herein.

In certain examples, after management facility 102 determines that the mobile computing device is within the geographic area specified by the geographic restriction parameter, management facility 102 may receive an updated geolocation key from the mobile computing device that is representative of an updated geographic location of the mobile computing device. Based on the updated geolocation key, management facility 102 may determine that the mobile computing device has exited the geographic area specified by the geographic restriction parameter. In response to the determination that the mobile computing device has exited the geographic area, management facility 102 may terminate the streaming of the media content to the mobile computing device. Management facility 102 may terminate the streaming of the media content to the mobile computing device in any suitable manner. For example, management facility 102 may instruct the media player to stop streaming the media content to the mobile computing device. Alternatively, management facility 102 may disable the URL provided to the mobile computing device such that the URL no longer may be used to access the media content. Management facility 102 may terminate the streaming of the media content in other ways in other implementations.

In certain examples, management facility 102 may determine whether the mobile computing device and the media player are linked to the same media service end-user account as a pre-condition to allowing the media content to be streamed to the mobile computing device. Management facility 102 may determine whether the mobile computing device and the media player are linked to the same media service end-user account in any suitable manner. For example, management facility 102 may detect a token provided with the request that indicates that the media player and the mobile computing device are linked to the same media service end-user account. Additionally or alternatively, a user of the mobile computing device may be required to log into the media service end-user account prior to sending the request to stream the media content from the media player. If management facility 102 determines that the mobile computing device and the media player are linked to the same media service end-user account, management facility 102 may then determine whether the mobile computing device is within a geographic area specified by the geographic restriction parameter based on a geolocation key provided by the mobile computing device. On the other hand, if management facility 102 determines that that the mobile computing device and the media player are not linked to a same media service end-user account, management facility 102 may prevent the media player from streaming the media content to the mobile computing device regardless of whether the mobile computing device is within the geographic area specified by the geographic restriction parameter.

Figure 2:
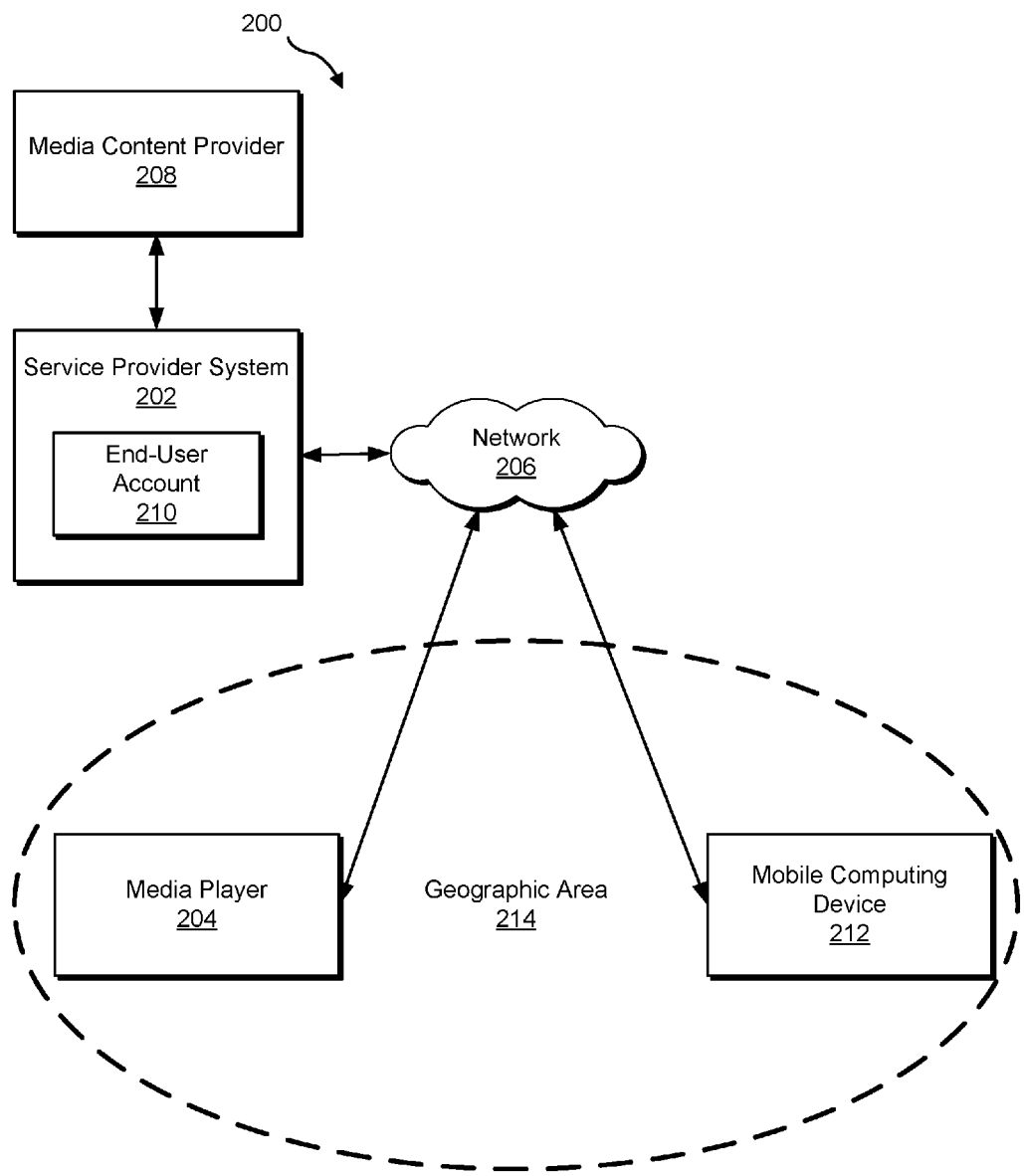
FIG. 2 illustrates an exemplary implementation of the system of FIG. 1 according to principles described herein.

FIG. 2 shows an exemplary implementation 200 of system 100 in which a service provider system 202 is communicatively coupled to a media player 204 by way of network 206. While FIG. 2 shows a particular number and arrangement of devices, in practice, implementation 200 may include additional, fewer, different, or differently arranged devices than are shown in FIG. 2.

Service provider system 202 may be configured to provide one or more media content services (e.g., television services, video-on-demand services, Internet services, application services, etc.) to media player 204. For example, service provider system 202 may be configured to manage (e.g., maintain, process, and/or generate) media content (e.g., media content programs, advertisements, etc.) and to distribute media content for access by media player 204. Service provider system 202 may be implemented by one or more computing devices (e.g., media content server computing devices) as may serve a particular implementation. Service provider system 202 may manage media programs, interface with one or more application programing interfaces associated with media content providers, and/or perform any other operations associated with the methods and systems described herein.

Media player 204 may be associated with (e.g., owned and/or operated by) an end user of a media content distribution service and may include any suitable computing device, such as described herein, that may be configured to facilitate presentation of media content to a user. In certain examples, media player 204 may be located at a user premises (e.g., a home) of the user.

In the example shown in FIG. 2, service provider system 202 may receive media content from a media content provider 208. Media content provider 208 may be any system and/or entity (e.g., a content producer such as ESPN, NBC, etc.) that may generate or otherwise provide media content. Although only one media content provider 208 is illustrated in FIG. 2, it is understood that service provider system 202 may receive media content from a plurality of different media content providers in certain implementations.

Media content distributed by service provider system 202 may be selectively made accessible to an end user of the media content distribution service in accordance with access rights of an end-user account 210 maintained by service provider system 202 for the end user and in accordance with one or more parameters included in a media content restriction list. In the example shown in FIG. 2, end-user account 210 is linked to and defines access rights associated with media player 204. Although FIG. 2 illustrates only one end-user account 210, it is understood that service provider system 202 may maintain a plurality of end-user accounts associated with different users registered with the media content distribution service.

End-user account 210 may represent a single end-user account registered with the media content distribution service (e.g., a household account with the media content distribution service). For example, end-user account 210 may be a single customer account with the media content distribution service (e.g., a subscription account for a subscriber to the media content distribution service). End-user account 210 may specify features, media programs distributed by way of the media content distribution service, and/or information about the media programs distributed by way of the media content distribution service that the end user and/or the media player 204 associated with the end-user account 210 is entitled to access. For example, end-user account 210 may include or otherwise be associated with a media content restriction list that specifies a plurality of media content access parameters that govern remote access to media content available by way of media player 204. In certain examples, end-user account 210 may be a television service subscription account that specifies a package of television channels that the end user and/or the media player 204 is entitled to access as part of the subscription based on a geographic location of media player 204. Based on access rights specified by end-user account 210, media player 204 may be granted access to certain channels and/or media programs associated with the channels at no additional charge (e.g., no purchase or rental fee on top of a subscription fee). Based on access rights specified by end-user account 210, media player 204 may be granted access to certain other channels and/or media programs associated with the other channels only if an additional charge (e.g., an increased subscription fee, a transactional purchase or rental fee, etc. on top of the subscription fee) is paid.

As shown in FIG. 2, media player 204 may be communicatively coupled to a mobile computing device 212 by way of network 206. Through mobile computing device 212, the user represented by end-user account 210 may leverage the access rights of end-user account 210 to access media content. Prior to mobile computing device 212 accessing the media content, mobile computing device 212 may go through an authentication process in which mobile computing device 212 is authenticated with service provider system 202. The authentication process may include, for example, mobile computing device 212 providing (e.g., in response to user input) user login credentials to, for example, an application server. Once authenticated, the user represented by end-user account 210 may, depending on the geographic location of mobile computing device 212, leverage the access rights of end-user account 210 to stream media content from media player 204 to mobile computing device 212. Although, FIG. 2 illustrates only one mobile computing device 212, it is understood that a plurality of mobile computing devices may stream media content from media player 204 at a given time subject to any restrictions specified in the media content restriction list.

As shown in FIG. 2, media player 204 and mobile computing device 212 are both within a geographic area 214. After mobile computing device 212 is authenticated with service provider system 202, mobile computing device 212 may send a request to stream media content from media player 204. Management facility 102 may analyze a geolocation key included in the request and determine (e.g., by comparing the geolocation key to a geographic restriction parameter associated with the media content) that mobile computing device 212 is within geographic area 214 where access to the media content is permitted. Accordingly, while mobile computing device 212 is within geographic area 214, mobile computing device 212 may be authorized to stream the media content from media player 204.

Management facility 102 and storage facility 104 may each be implemented by service provider system 202, media player 204, mobile computing device 212, or a combination or sub-combination thereof. Accordingly, in certain embodiments, components of system 100 may be implemented entirely by service provider system 202, by media player 204, or by mobile computing device 212. In other embodiments, components of system 100 may be distributed across a combination or sub-combination of service provider system 202, media player 204, and mobile computing device 212.

Service provider system 202, media player 204, media content provider 208, and mobile computing device 212 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Long Term Evolution ("LTE") technologies, Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Radio Frequency ("RF") signaling technologies, wireless communication technologies, Internet communication technologies, Internet communication technologies, digital content streaming technologies, digital content download technologies, Bluetooth communications technologies and other suitable communications technologies.

In certain embodiments, service provider system 202, media player 204, and mobile computing device 212 may communicate via network 206. Network 206 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., transmitting media program data and/or summaries of media programs) and/or communications signals between service provider system 202, media player 204, and mobile computing device 212. Communications between service provider system 202, media player 204, and mobile computing device 212 may be transported using any one of the above-listed networks, or any combination or sub-combination of the above-listed networks. Alternatively, service provider system 202, media player 204, and mobile computing device 212 may communicate in another way such as by direct connections between service provider system 202, media player 204, and mobile computing device.

Figure 3:
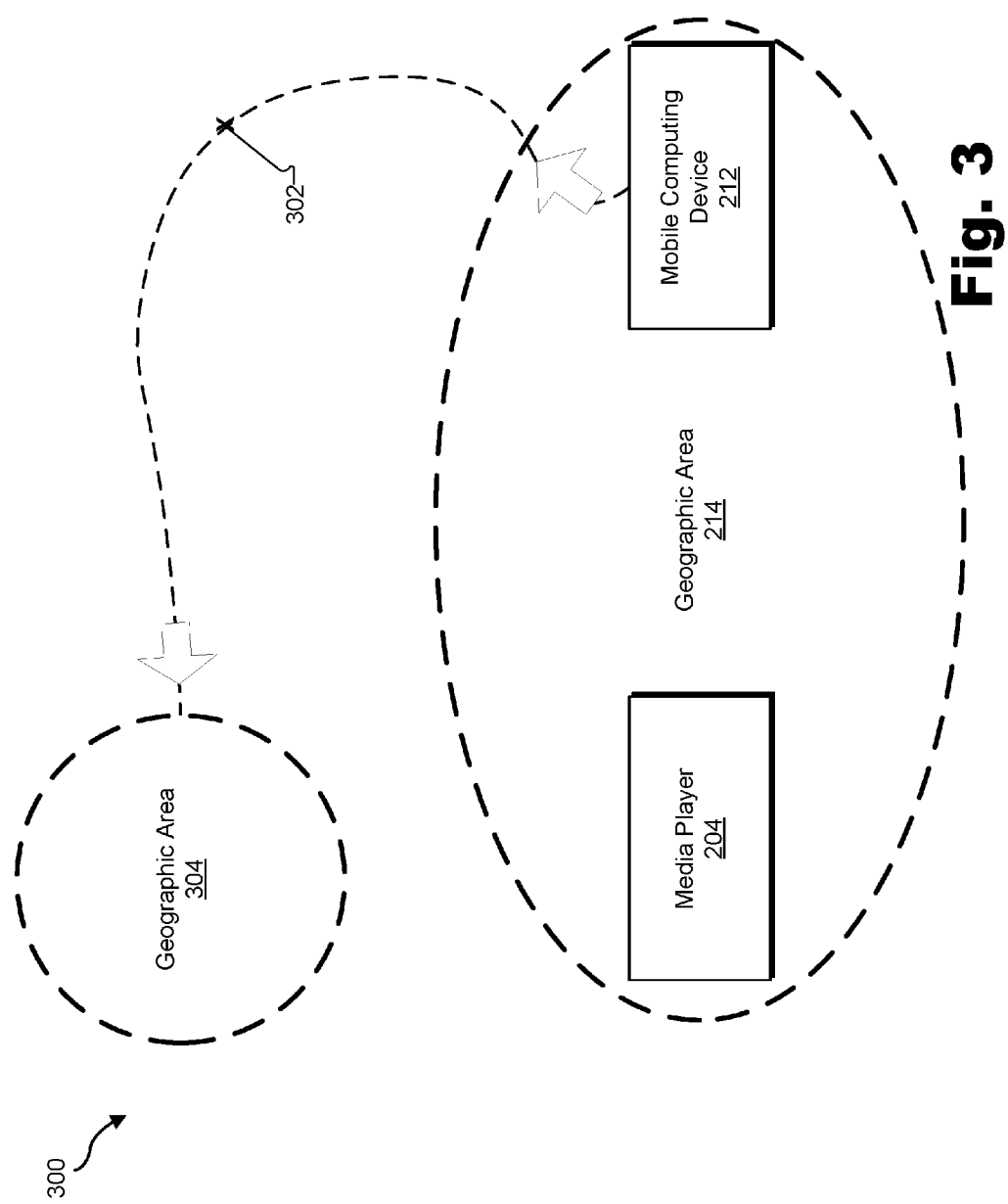
FIG. 3 illustrates an exemplary geographic restriction map according to principles described herein.

The ability of mobile computing device 212 to stream media content from media player 204 may depend on a current geographic location of mobile computing device 212, not a geographic location of media player 204. To illustrate, FIG. 3 shows an exemplary geographic restriction map 300 in which mobile computing device 212 moves or is otherwise transported from geographic area 214 along a route 302. While in geographic area 214, media player 204 may receive a request from mobile computing device 212 for media player 204 to stream a first media program to mobile computing device 212. The request may include a geolocation key that is representative of a geographic location of mobile computing device 212 when the mobile computing device sends the request. Media player 204 may access a media content restriction list and determine, based on a geographic restriction parameter associated with the first media program, that access to the first media program is limited to within geographic area 214. Based on the geolocation key and the geographic restriction parameter associated with the first media program, media player 204 may determine that mobile computing device 212 is within geographic area 214 and stream the first media program to mobile computing device 212. After media player 204 starts streaming the first media program to mobile computing device 212, mobile computing device 212 may move or otherwise be transported by a user out of geographic area 214. After mobile computing device 212 exits geographic area 214, media player 204 may receive an updated geolocation key from mobile computing device 212. Media player 204 may compare the updated geolocation key with the geographic restriction parameter associated with the first media program. Based on the comparison, media player 204 may determine that mobile computing device 212 is not within geographic area 214. Accordingly, media player 204 may terminate the streaming of the first media program to mobile computing device 212 in any suitable manner.

As shown in FIG. 3, after mobile computing device 212 exits geographic area 214, mobile computing device 212 travels along route 302 to enter geographic area 304. While mobile computing device 212 is in geographic area 304, media player 204 may receive an additional request from mobile computing device 212 for media player 204 to stream a second media program to mobile computing device 212. The request may include an additional geolocation key that is representative of a geographic location of mobile computing device 212 when the mobile computing device sends the additional request from geographic area 304. Media player 204 may access a media content restriction list and determine, based on a geographic restriction parameter associated with the second media program, that access to the second media program is limited to within geographic area 304. Based on the additional geolocation key and the geographic restriction parameter associated with the second media program, media player 204 may determine that mobile computing device 212 is within geographic area 304 and stream the second media program to mobile computing device 212. In this or a similar manner, the systems and methods described herein may conveniently facilitate a mobile computing device remotely accessing media content that would not otherwise be accessible at a geographic location of a media player.

As mentioned above, in certain examples, management facility 102 may provide a URL to mobile computing device 212 to facilitate mobile computing device 212 streaming the media content from media player 204. Management facility 102 may selectively provide a URL to mobile computing device 212 based on a determined geographic location of mobile computing device 212. Various different communication sequences that may occur when management facility 102 selectively provides the URL to mobile computing device 212 will now be described with reference to FIGS. 4-5.

Figure 4:
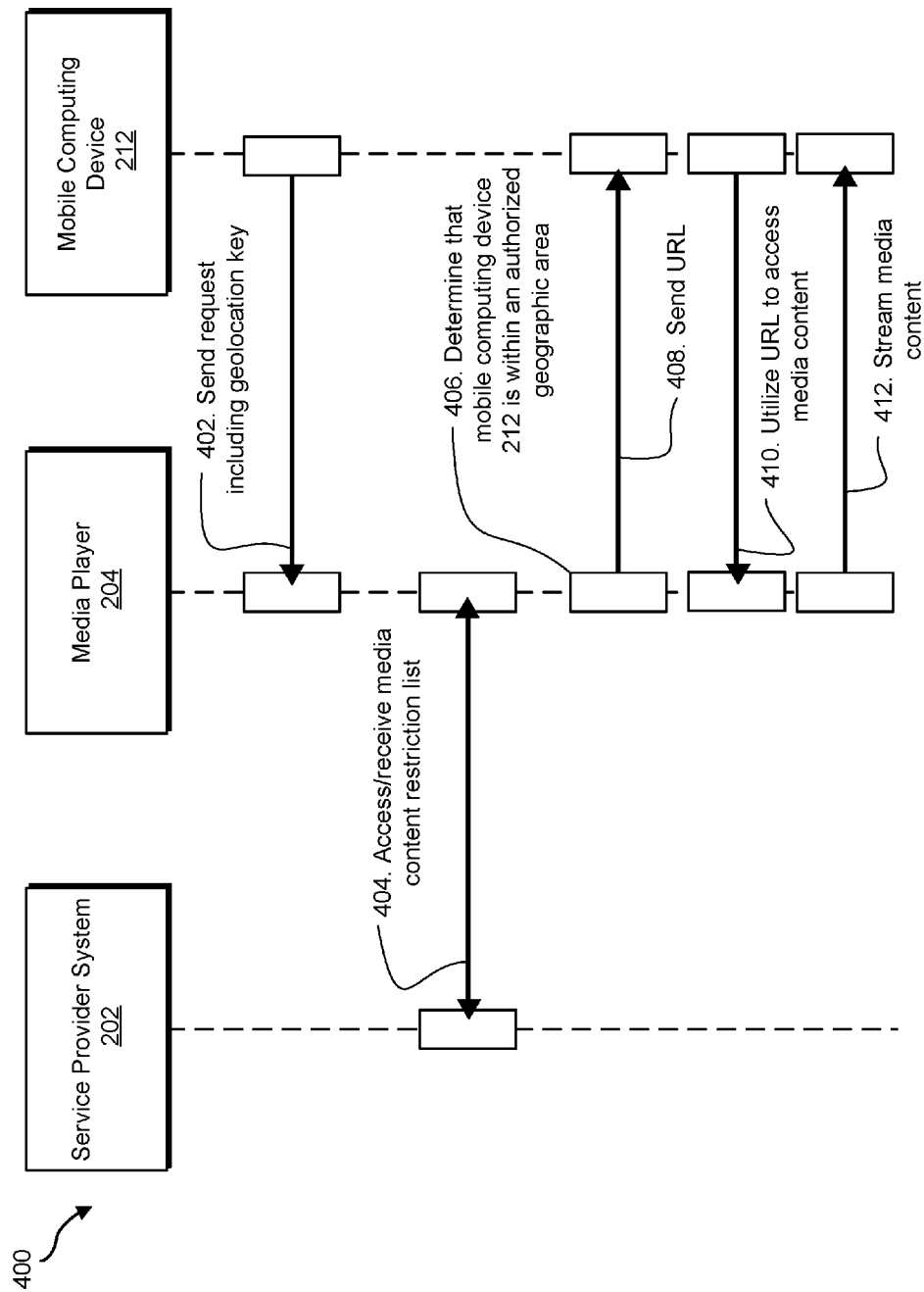
FIGS. 4-5 illustrate exemplary sequence diagrams according to principles described herein.
Figure 5:
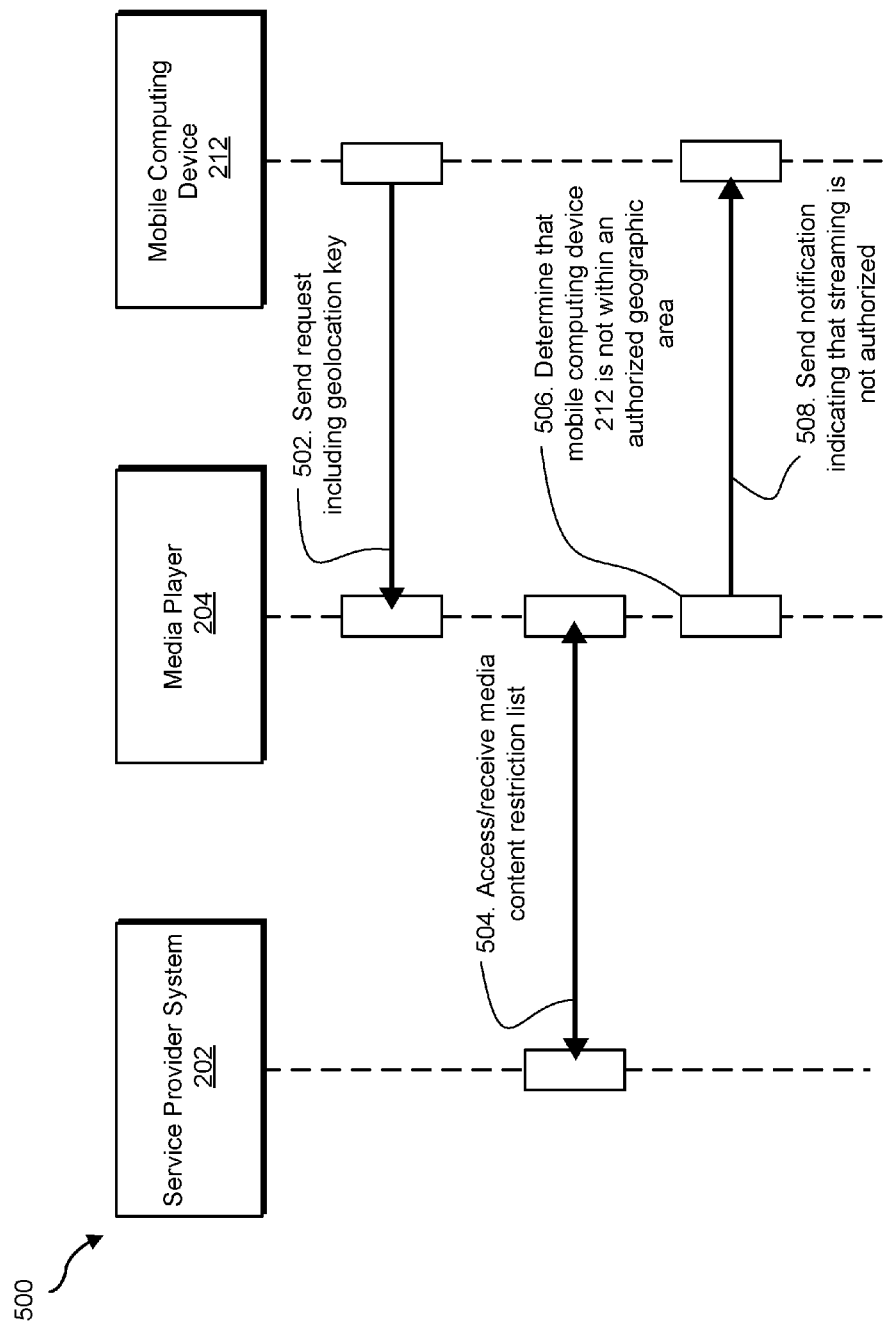

FIGS. 4-5 illustrate exemplary sequence diagrams that show ways in which various devices/systems illustrated in FIG. 2 may communicate based on a geographic location of mobile computing device 212. For example, FIG. 4 depicts an exemplary sequence diagram 400 showing how mobile computing device 212 may communicate with media player 204 to facilitate management facility 102 providing a URL to mobile computing device 212. In FIG. 4, arrow 402 represents a request sent from mobile computing device 212 to media player 204. The request represented by arrow 402 includes a geolocation key that is representative of a geographic location of mobile computing device 212 when mobile computing device 212 provides the request. Arrow 404 represents communications between service provider system 202 and media player 204 in which media player 204 either accesses a media content restriction list stored by service provider system 202 or receives the media content restriction list from service provider system 202. In certain examples, media player 204 may request or otherwise access an updated media content restriction list upon receiving the request. Box 406 represents media player 204 determining, based on the geolocation key and a geographic restriction parameter, that mobile computing device 212 is within an authorized geographic area. Arrow 408 represents media player 204 sending the URL to computing device 212 in response to the determination that mobile computing device 212 is within the authorized geographic area. Arrow 410 represents mobile computing device 212 utilizing the URL to access the media content from media player 204. Arrow 412 represents media player 204 streaming the media content associated with the URL to mobile computing device 212.

FIG. 5 depicts an exemplary sequence diagram 500 showing how mobile computing device 212 may communicate with media player 204 in an example where mobile computing device 212 is not within a geographic area specified by a geographic restriction parameter. In FIG. 5, arrow 502 represents a request sent from mobile computing device 212 to media player 204. The request represented by arrow 502 includes a geolocation key that is representative of a geographic location of mobile computing device 212 when mobile computing device 212 provides the request. Arrow 504 represents communications between service provider system 202 and media player 204 in which media player 204 either accesses a media content restriction list stored by service provider system 202 or receives the media content restriction list from service provider system 202. Box 506 represents media player 204 determining, based on the geolocation key and a geographic restriction parameter associated with the media content, that mobile computing device 212 is not within a within a geographic area where access to the media content is authorized. Arrow 508 represents media player 204 sending a notification to computing device 212 indicating that mobile computing device 212 is not within the authorized geographic area. The notification may include any suitable notification that may inform a user of mobile computing device that mobile computing device 212 is not in a geographic area where access to the media content is authorized. For example, the notification may include a text notification presented for display on a display screen of mobile computing device 212.

In certain examples, management facility 102 may provide an additional notification (not shown) to mobile computing device 212 if mobile computing device 212 subsequently enters the geographic area. Such a notification may inform the user of mobile computing device 212 that it is now possible to access the media content that was previously restricted.

The exemplary sequence diagrams illustrated in FIGS. 4-5 are provided for illustrative purposes only. It is understood that the various devices/systems illustrated in FIG. 2 may communicate in other ways in other implementations.

Figure 6:
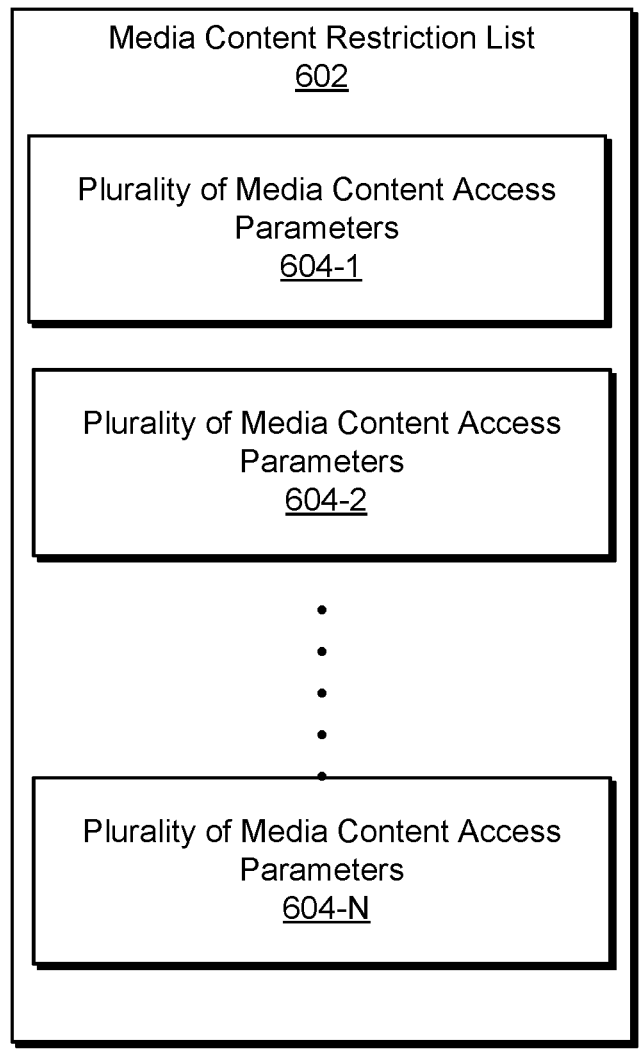
FIGS. 6-7 illustrate exemplary restriction lists according to principles described herein.

FIG. 6 illustrates an exemplary media content restriction list 602. As shown in FIG. 6, media content restriction 602 list may include a plurality of media content access parameters 604 (e.g., plurality of media content access parameters 604-1 through 604-N). Each of the plurality of media content access parameters 604 may pertain to a channel that carries the media content, a media content provider that provides the media content, or a particular media program included in the media content. For example, media content access parameters 604-1 may be associated with a particular media content provider that provides media content. Media content access parameters 604-1 may specify that any content provided by the particular media content provider is only available within a geographic area specified by a geographic restriction parameter included in the plurality of media content access parameters 604-1. Media content access parameters 604-2, on the other hand, may be associated with a particular channel that carries the media content. Media content access parameters 604-2 may specify that any content provided by way of the particular channel is only available within a geographic area specified by a geographic restriction parameter included in plurality of media content access parameters 604-2.

Figure 7:
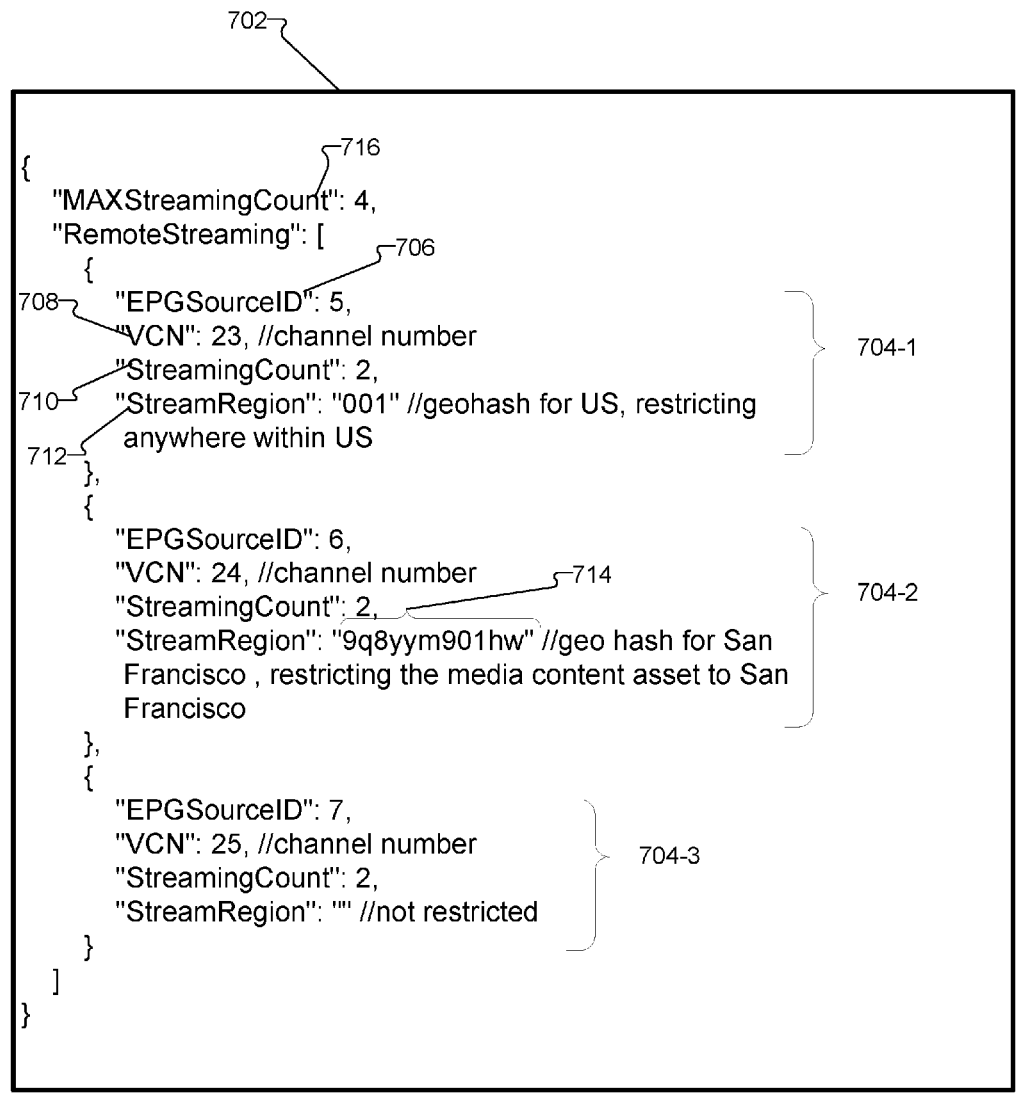

FIG. 7 illustrates another exemplary media content restriction list 702. As shown in FIG. 7, media content restriction list 702 includes a plurality of media content access parameters 704 (e.g., a plurality of media content access parameters 704-1 through 704-3) ("access parameters 704-1 through 704-3"). In the example shown in FIG. 7, each of access parameters 704 includes an electronic program source ID ("EPGSourceID") entry field 706, a virtual channel number ("VCN") entry field 708, a "StreamingCount" entry field 710, and a "StreamRegion" entry field 712. In the example shown in FIG. 7, the "StreamRegion" entry field 712 corresponds to a geographic restriction requirement. As shown in FIG. 7, access parameters 704-1 are associated with media content from channel 23. The "StreamingCount" entry field in access parameters 704-1 indicates that a maximum of two mobile computing devices (e.g., mobile computing device 212) may stream content from channel 23 at a given time. Access parameters 704-1 also indicate that the "Stream Region" (i.e., the geographic restriction parameter) associated with channel 23 is region "001," which corresponds to anywhere within the United States.

Access parameters 704-2, on the other hand, are associated with media content from channel 24. The "StreamingCount" entry field in access parameters 704-2 indicates that a maximum of two mobile computing devices may stream media content from channel 24 at a given time. The "StreamRegion" entry field in access parameters 704-2 includes a geohash 714 that comprises a unique alphanumeric string "9q8yym901hw." The alphanumeric string "9q8yym901hw" is the geohash for San Francisco, Calif. and is representative of a latitude coordinate of 37.7792607 and a longitude coordinate of −122.4192294. Access parameters 704-3 are associated with media content from channel 25. The "StreamingCount" entry field included in access parameters 704-3 also indicates that a maximum of two mobile computing devices may stream content from channel 25 at a given time. Access parameters 704-3 do not include an entry in the "Stream Region" entry field (i.e., there is no geographic restriction parameter associated with channel 25). Accordingly, media content associated with channel 25 may be streamed from a media player (e.g., media player 204) to a mobile computing device regardless of a geographic location of the mobile computing device.

Management facility 102 may utilize the parameters included in media content restriction list 702 in any suitable manner. To illustrate an example, a professional baseball team may want to restrict access to a live broadcast of a baseball game by way of channel 24 to a geographic area associated with the city of San Francisco, Calif. Such a restriction may be based on a broadcast television contract between the professional baseball team and a service provider system (e.g., service provider system 202). Based on this restriction, management facility 102 may maintain restriction list 702 such that access parameters 704-2 are in place during a time period associated with the live broadcast of the baseball game. During the live broadcast, a mobile computing device located in Oakland, Calif. may send a request to a media player to stream the live broadcast of the baseball game from the media player. The request may include an encoded geohash of "9q9p1d5zfks" as a geolocation key. Management facility 102 may verify, in any suitable manner, that the encoded geohash included in the request is not within the bounds of the geographic restriction parameter "9q8yym901hw" specified in the "Stream Region" entry field of access parameters 704-2. Accordingly, management facility 102 may reject the request to stream the live broadcast of the baseball game from the media player to the mobile computing device.

In another example, the mobile computing device may, while located in Oakland, Calif., send an additional request to the media player to stream a nationally broadcast television program provided on channel 23. The additional request may also include the encoded geohash of "9q9p1d5zfks" as a geolocation key. Management facility 102 may verify that the encoded geohash included in the request is within the bounds of the geographic restriction parameter of region "001" (i.e., within the United States) and may facilitate the streaming of the nationally broadcast television program from the media player to the mobile computing device. For example, management facility 102 may direct the media player to provide a URL to the mobile computing device to facilitate playback of the nationally broadcast television program.

FIG. 7 also illustrates a "MAXStreamingCount" entry field 716. The "MAXStreamingCount" entry field 716 is a global parameter that indicates a maximum number of mobile computing devices that may stream media content by way of a particular media player at a given time. In the example shown in FIG. 7, a value of four is indicated in "MAXStreamingCount" entry field 716. This means that only four mobile computing devices may stream media content from the particular media player at a given time. For example, if two mobile computing devices are currently streaming channel 23 media content and two mobile computing devices are streaming channel 24 media content, no additional mobile computing devices would be permitted to stream channel 25 media content until at least one of the other four mobile computing devices stops streaming the media content from channel 23 or 24.

Figure 8:
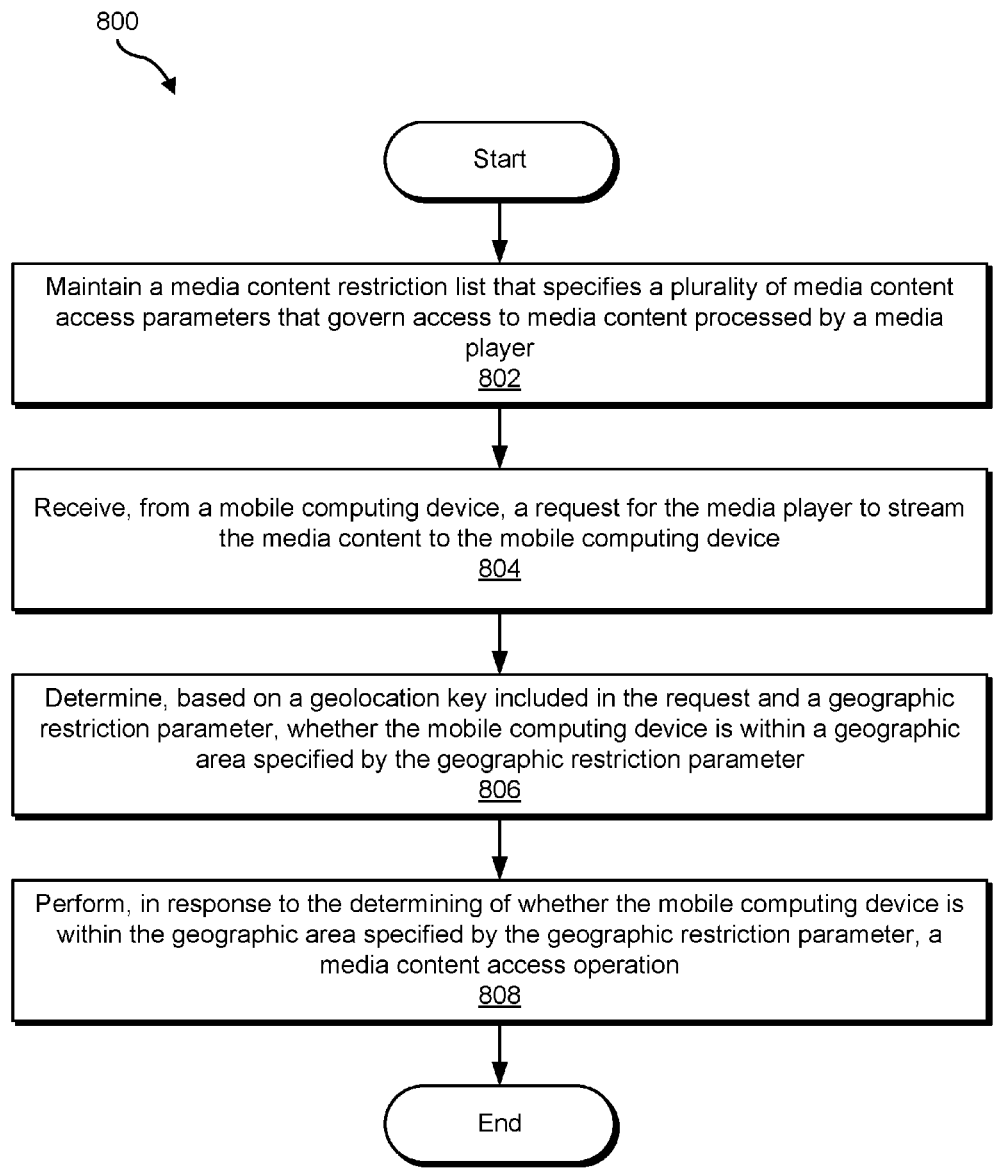
FIGS. 8-9 illustrate exemplary location-based media content access management methods according to principles described herein.
Figure 9:
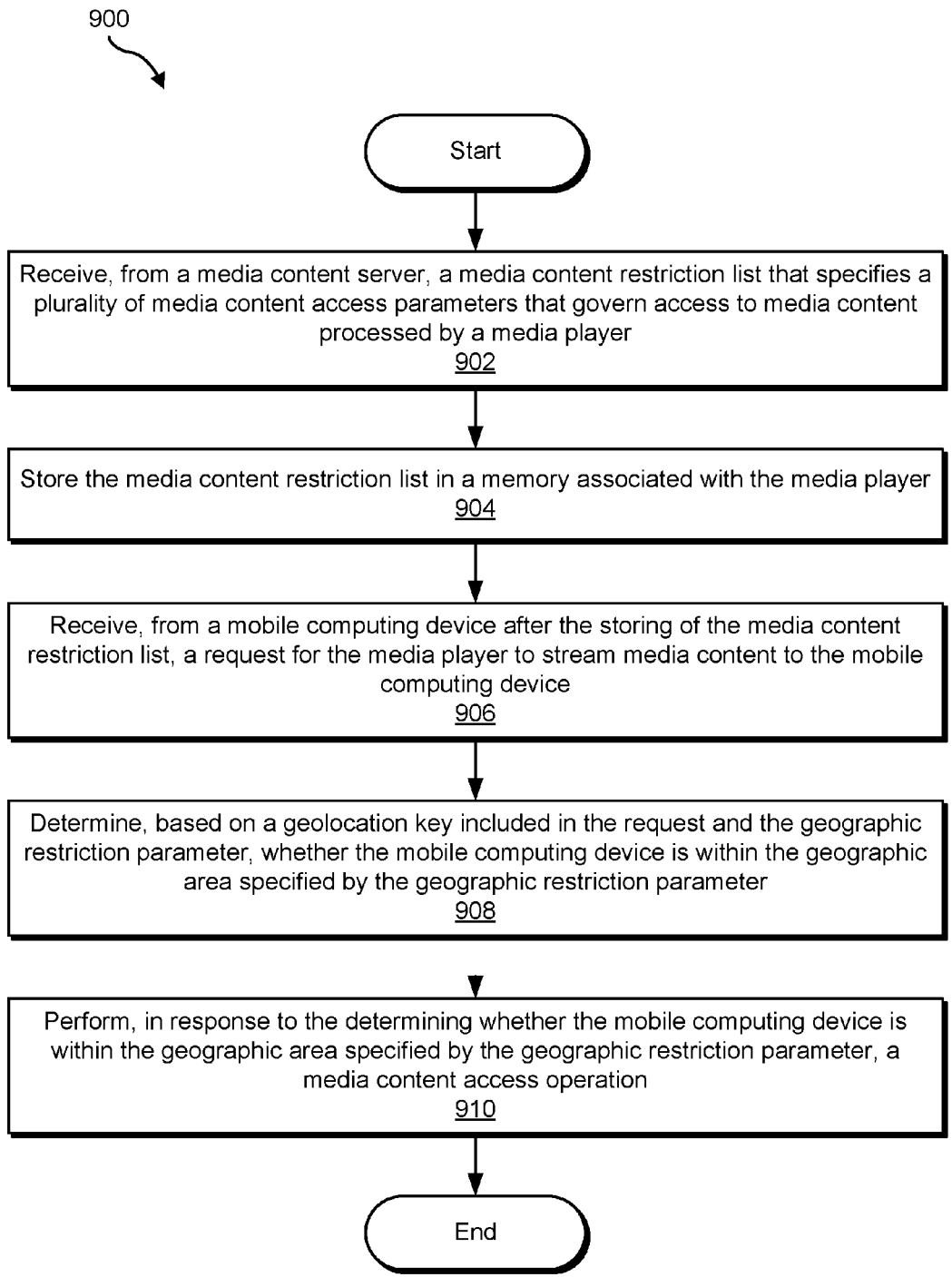

FIGS. 8-9 illustrate exemplary location-based media content access management methods 800 and 900 according to principles described herein. While FIGS. 8-9 illustrate exemplary operations according to certain embodiments, other embodiments may omit, add to, reorder, combine, and/or modify any of the operations shown in FIGS. 8-9. In certain embodiments, one or more of the operations shown in FIGS. 8-9 may be performed by system 100 and/or one or more components or implementations of system 100.

Turning to FIG. 8, in operation 802, a system (e.g., system 100) may maintain a media content restriction list that specifies a plurality of media content access parameters that govern access to media content processed by a media player. As described herein, the plurality of media content access parameters may include a geographic restriction parameter that specifies a geographic area within which remote access to the media content processed by the media player is permitted. Operation 802 may be performed in any of the ways described herein.

In operation 804, the system may receive, from a mobile computing device, a request for the media player to stream the media content to the mobile computing device. The request may include a geolocation key that is representative of a geographic location of the mobile computing device when the mobile computing device provides the request. Operation 804 may be performed in any of the ways described herein.

In operation 806, the system may determine, based on the geolocation key included in the request and the geographic restriction parameter, whether the mobile computing device is within the geographic area specified by the geographic restriction parameter. Operation 806 may be performed in any of the ways described herein.

In operation 808, the system may, in response to the determining of whether the mobile computing device is within the geographic area specified by the geographic restriction parameter, perform a media content access operation. As described herein, the media content access operation may include directing the media player to stream the media content to the mobile computing device if the determining whether the mobile computing device is within the geographic area specified by the geographic restriction parameter comprises determining that the mobile computing device is within the geographic area specified by the geographic restriction parameter. Alternatively, the media content access operation may include preventing the media player from streaming the media content to the mobile computing device if the determining whether the mobile computing device is within the geographic area specified by the geographic restriction parameter comprises determining that the mobile computing device is not within the geographic area specified by the geographic restriction parameter. Operation 808 may be performed in any of the ways described herein.

Turing to FIG. 9, in operation 902, a media player (e.g., media player 204) may receive, from a media content server, a media content restriction list that specifies a plurality of media content access parameters that govern access to media content processed by the media player. As described herein, the plurality of media content access parameters may include a geographic restriction parameter that specifies a geographic area within which remote access to the media content processed by the media player is permitted. Operation 902 may be performed in any of the ways described herein.

In operation 904, the media player may store, the media content restriction list in a memory associated with the media player. Operation 904 may be performed in any of the ways described herein.

In operation 906, the media player may receive, from a mobile computing device after the storing of the media content restriction list, a request for the media player to stream media content to the mobile computing device. As described herein, the request may include a geolocation key that is representative of a geographic location of the mobile computing device when the mobile computing device sends the request. Operation 906 may be performed in any of the ways described herein.

In operation 908, the media player may determine, based on the geolocation key included in the request and the geographic restriction parameter, whether the mobile computing device is within the geographic area specified by the geographic restriction parameter. Operation 908 may be performed in any of the ways described herein.

In operation 910, the media player may, in response to the determining whether the mobile computing device is within the geographic area specified by the geographic restriction parameter, perform a media content access operation. The media content access operation may include the media player streaming the media content to the mobile computing device if the determining whether the mobile computing device is within the geographic area specified by the geographic restriction parameter comprises determining that the mobile computing device is within the geographic area specified by the geographic restriction parameter. Alternatively, the media content access operation may include the media player abstaining from streaming the media content to the mobile computing device if the determining whether the mobile computing device is within the geographic area specified by the geographic restriction parameter comprises determining that the mobile computing device is not within the geographic area specified by the geographic restriction parameter. Operation 910 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 10:
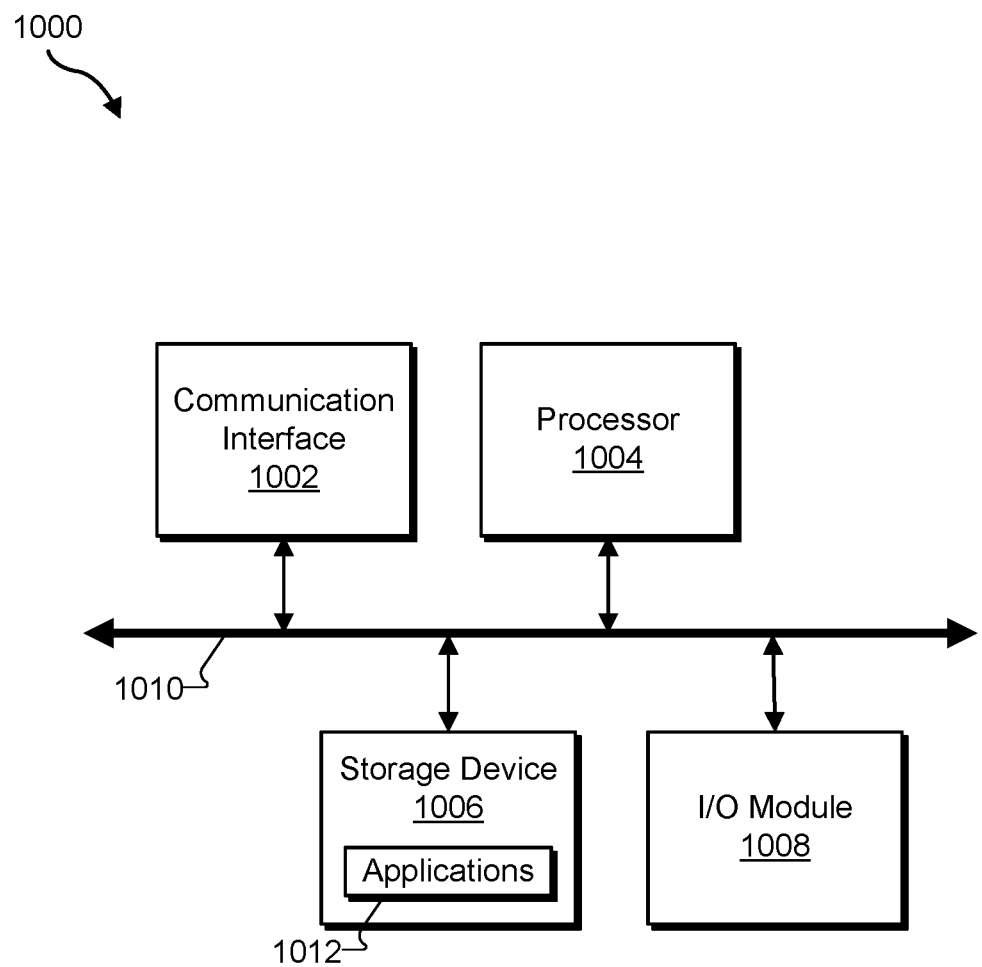
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output (I/O) module 1008 communicatively connected via a communication infrastructure 1010. While an exemplary computing device 1000 is shown in FIG. 10, the components illustrated in FIG. 10 are not intended to be limiting. Additional or alternative components and/or configurations of components may be used in other embodiments. For example, in addition or alternative to being communicatively connected by way of communication infrastructure 1010, one or more components of computing device 1000 may be communicatively connected by way of one or more other suitable interfaces. For instance, communication interface 1002, storage device 1006, I/O module 1008, and/or any other components of computing device 1000 may be communicatively coupled directly to processor 1004 via one or more interfaces (e.g., discrete interfaces). Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. In at least one embodiment, communication interface 1002 may provide a direct connection between system 100 and one or more of provisioning systems via a direct link to a network, such as the Internet. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a touch screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with system 100 or any components thereof. Such an implementation may be referred to as a computer-implemented system, such as a computer-implemented media content access system 100.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by at least one physical computing device of a media content access system, a media content restriction list that specifies a plurality of media content access parameters that govern access to media content processed by a media player, the plurality of media content access parameters including a geographic restriction parameter that specifies a geographic area within which remote access to the media content processed by the media player is permitted;

receiving, by the at least one physical computing device of the media content access system from a mobile computing device, a request for the media player to stream the media content to the mobile computing device, the request including a geolocation key that is representative of a geographic location of the mobile computing device when the mobile computing device provides the request;

determining, by the at least one physical computing device of the media content access system based on the geolocation key included in the request and the geographic restriction parameter, whether the mobile computing device is within the geographic area specified by the geographic restriction parameter; and performing, by the at least one physical computing device of the media content access system in response to the determining of whether the mobile computing device is within the geographic area specified by the geographic restriction parameter, a media content access operation that includes one of directing the media player to stream the media content to the mobile computing device if the determining whether the mobile computing device is within the geographic area specified by the geographic restriction parameter comprises determining that the mobile computing device is within the geographic area specified by the geographic restriction parameter, and preventing the media player from streaming the media content to the mobile computing device if the determining whether the mobile computing device is within the geographic area specified by the geographic restriction parameter comprises determining that the mobile computing device is not within the geographic area specified by the geographic restriction parameter.

2. The method of claim 1, wherein:
the determining whether the mobile computing device is within the geographic area specified by the geographic restriction parameter comprises determining that the mobile computing device is within the geographic area specified by the geographic restriction parameter; and
the method further comprises:
receiving, by the at least one physical computing device of the media content access system after the determining that the mobile computing device is within the geographic area specified by the geographic restriction parameter, an updated geolocation key that is representative of an updated geographic location of the mobile computing device;
determining, by the at least one physical computing device of the media content access system based on the updated geolocation key, that the mobile computing device has exited the geographic area specified by the geographic restriction parameter; and
terminating, by the at least one physical computing device of the media content access system in response to the determining that the mobile computing device has exited the geographic area, the streaming of the media content to the mobile computing device.

3. The method of claim 1, further comprising:
determining, by the at least one physical computing device of the media content access system, that the mobile computing device and the media player are not linked to a same media service end-user account; and
preventing, by the at least one physical computing device of the media content access system in response to the determining that the mobile computing device and the media player are not linked to the same media service end-user account, the media player from streaming the media content to the mobile computing device regardless of whether the mobile computing device is within the geographic area specified by the geographic restriction parameter.

4. The method of claim 1, further comprising:
detecting, by the at least one physical computing device of the media content access system, longitude and latitude coordinates of the mobile computing device; and
generating, by the at least one physical computing device of the media content access system based on the longitude and latitude coordinates of the mobile computing device, the geolocation key.

5. The method of claim 1, wherein the media content restriction list specifies an additional plurality of media content access parameters that govern access to additional media content processed by the media player, the additional plurality of media content access parameters including an additional geographic restriction parameter that specifies an additional geographic area within which remote access to the additional media content processed by the media player is permitted.

6. The method of claim 1, wherein a parameter included in the plurality of media content access parameters specifies a maximum number of mobile computing devices that are permitted to stream the media content from the media player at a given time.

7. The method of claim 1, wherein:
the determining whether the mobile computing device is within the geographic area specified by the geographic restriction parameter comprises determining that the mobile computing device is within the geographic area specified by the geographic restriction parameter; and
the method further comprises providing, by the at least one physical computing device of the media content access system in response to the determining that the mobile computing device is within the geographic area specified by the geographic restriction parameter, a uniform resource locator ("URL") to the mobile computing device to facilitate the mobile computing device streaming the media content from the media player.

8. The method of claim 1, wherein the maintaining of the restriction list includes
receiving the plurality of media content access parameters from a media content server, and
storing the plurality of media content access parameters in a memory associated with the media content access system.

9. The method of claim 1, embodied as computer-executable instructions on at least one non-transitory computer-readable medium.

10. A method comprising:
receiving, by a media player from a media content server, a media content restriction list that specifies a plurality of media content access parameters that govern access to media content processed by the media player, the plurality of media content access parameters including a geographic restriction parameter that specifies a geographic area within which remote access to the media content processed by the media player is permitted;
storing, by the media player, the media content restriction list in a memory associated with the media player;
receiving, by the media player from a mobile computing device, a request for the media player to stream media content to the mobile computing device, the request including a geolocation key that is representative of a geographic location of the mobile computing device when the mobile computing device sends the request;

determining, by the media player based on the geolocation key included in the request and the geographic restriction parameter included in the media content restriction list stored in the memory associated with the media player, whether the mobile computing device is within the geographic area specified by the geographic restriction parameter; and performing, by the media player in response to the determining whether the mobile computing device is within the geographic area specified by the geographic restriction parameter, a media content access operation that includes one of streaming the media content to the mobile computing device if the determining whether the mobile computing device is within the geographic area specified by the geographic restriction parameter comprises determining that the mobile computing device is within the geographic area specified by the geographic restriction parameter, and abstaining from streaming the media content to the mobile computing device if the determining whether the mobile computing device is within the geographic area specified by the geographic restriction parameter comprises determining that the mobile computing device is not within the geographic area specified by the geographic restriction parameter.

11. The method of claim 10, further comprising:
receiving, by the media player from the media content server, an updated geographic restriction parameter that specifies an updated geographic area within which remote access to the media content processed by the media player is permitted; and
updating, by the media player the restriction list such that the plurality of media content access parameters includes the updated geographic restriction parameter in place of the geographic restriction parameter.

12. The method of claim 10, wherein:
the determining whether the mobile computing device is within the geographic area specified by the geographic restriction parameter comprises determining that the mobile computing device is within the geographic area specified by the geographic restriction parameter; and
the method further comprises sending, by the media player to the mobile computing device, a uniform resource locator ("URL") that facilitates the mobile computing device streaming the media content from the media player.

13. The method of claim 10, further comprising:
streaming, by the media player, the media content to the mobile computing device;
receiving, by the media player during the streaming of the media content, an updated geolocation key that is representative of the updated geographic location of the mobile computing device;
determining, by the media player based on the updated geolocation key, that the mobile computing device has exited the geographic area specified by the geographic restriction parameter; and
stopping, by the media player based on the updated geolocation key, the streaming of the media content based on the mobile computing device exiting the geographic area specified by the geographic restriction parameter.

14. The method of claim 10, embodied as computer-executable instructions on at least one non-transitory computer-readable medium.

15. A media content access system comprising:
at least one physical computing device comprising a processor and memory and that:
maintains a media content restriction list that specifies a plurality of media content access parameters that govern access to media content processed by a media player, the plurality of media content access parameters including a geographic restriction parameter that specifies a geographic area within which remote access to the media content processed by the media player is permitted;
receives, from a mobile computing device, a request for the media player to stream the media content to the mobile computing device, the request including a geolocation key that is representative of a geographic location of the mobile computing device when the mobile computing device provides the request;
determines, based on the geolocation key included in the request and the geographic restriction parameter, whether the mobile computing device is within the geographic area specified by the geographic restriction parameter; and
performs, in response to the determining of whether the mobile computing device is within the geographic area specified by the geographic restriction parameter, a media content access operation that includes one of
directing the media player to stream the media content to the mobile computing device if the at least one physical computing device determines that the mobile computing device is within the geographic area specified by the geographic restriction parameter, and
preventing the media player from streaming the media content to the mobile computing device if the at least one physical computing device determines that the mobile computing device is not within the geographic area specified by the geographic restriction parameter.

16. The media content access system of claim 15, wherein:
the at least one physical computing device determines whether the mobile computing device is within the geographic area specified by the geographic restriction parameter by determining that the mobile computing device is within the geographic area specified by the geographic restriction parameter; and
the at least one physical computing device further:
receives, after the at least one physical computing device determines that the mobile computing device is within the geographic area specified by the geographic restriction parameter, an updated geolocation key that is representative of an updated geographic location of the mobile computing device;
determines, based on the updated geolocation key, that the mobile computing device has exited the geographic area specified by the geographic restriction parameter; and
terminates, after the at least one physical computing device determines that the mobile computing device has exited the geographic area, the streaming of the media content to the mobile computing device.

17. The media content access system of claim 15, wherein the at least one physical computing device further:

identifies that the mobile computing device and the media player are not linked to a same media service user account; and prevents, after the at least one physical computing device identifies that the mobile computing device and the media player are not linked to the same media service user account, the media player from streaming the media content to the mobile computing device regardless of whether the mobile computing device is within the geographic area specified by the geographic restriction parameter.

18. The media content access system of claim 15, wherein:

the at least one physical computing device determines whether the mobile computing device is within the geographic area specified by the geographic restriction parameter by determining that the mobile computing device is within the geographic area specified by the geographic restriction parameter; and the at least one physical computing device further provides, after the at least one physical computing device determines that the mobile computing device is within the geographic area specified by the geographic restriction parameter, a uniform resource locator ("URL") to the mobile computing device to facilitate the mobile computing device streaming the media content from the media player.

19. The method of claim 1, wherein the geolocation key comprises a unique identifier of the geographic location of the mobile computing device when the mobile computing device provides the request.

20. The system of claim 15, wherein the media content access system comprises a media content provider system, a server provider system, and the media player communicatively coupled by way of a network.

* * * * *